(12) United States Patent
McCaffrey et al.

(10) Patent No.: US 11,143,040 B2
(45) Date of Patent: Oct. 12, 2021

(54) CERAMIC MATRIX COMPOSITE ROTOR BLADE ATTACHMENT AND METHOD OF MANUFACTURE THEREFOR

(71) Applicant: United Technologies Corporation, Farmington, CT (US)

(72) Inventors: Michael G. McCaffrey, Windsor, CT (US); Karl A. Mentz, Reading, MA (US); Christopher King, Bristol, CT (US); Stephen D. Doll, Ponte Vedra, FL (US); Aurelia Ledbetter, Woodstock, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 64 days.

(21) Appl. No.: 16/590,925

(22) Filed: Oct. 2, 2019

(65) Prior Publication Data

US 2021/0102468 A1 Apr. 8, 2021

(51) Int. Cl.
*F01D 5/00* (2006.01)
*F01D 5/28* (2006.01)

(52) U.S. Cl.
CPC .............. *F01D 5/284* (2013.01); *F01D 5/282* (2013.01); *F05D 2220/32* (2013.01); *F05D 2300/6033* (2013.01)

(58) Field of Classification Search
CPC .......... F01D 5/284; F01D 5/286; F01D 5/288; F01D 5/3007; F01D 5/3015; F01D 5/30;
(Continued)

(56) References Cited

U.S. PATENT DOCUMENTS 5,049,036 A * 9/1991 Bailey .................... F01D 5/282
416/230
6,017,263 A 1/2000 Dwyer
(Continued)

FOREIGN PATENT DOCUMENTS

EP 2902588 A1 8/2015
WO 2014164859 A2 10/2014
WO 2015061109 A1 4/2015

OTHER PUBLICATIONS

EP Search Report dated Feb. 2, 2021 issued for corresponding European Patent Application No. 20199894.5.

*Primary Examiner* — Shafiq Mian
(74) *Attorney, Agent, or Firm* — Bachman & LaPointe, P.C.

(57) ABSTRACT

A process for manufacturing a composite rotor blade includes manufacturing an oversized root region of a root region of a composite rotor blade; fixturing the CMC blade into a machining fixture at a primary Y and Z axis datum located at an attachment fillet radii of the root region; machining V-notches into the oversized root region to form a Y' and Z' axis datum of a sacrificial datum system in relation to the primary Y and Z axis datum; applying an oversized coating layer over the attachment fillet radii of the root region; fixturing the CMC blade into a machining fixture at the Y' and Z' axis datum of the sacrificial datum system; machining the oversized coating layer to a machined coating layer forming a Y''' and Z'' axis datum with respect to the Y' and Z' axis datum of the sacrificial datum system; fixturing the CMC blade into a machining fixture at the Y''' and Z'' axis datum; and machining off the sacrificial datum system removing the V-notches.

18 Claims, 6 Drawing Sheets

(58) Field of Classification Search
CPC ........ F01D 5/32; F01D 5/282; F05D 2220/32; F05D 2300/6033; B23H 9/10; Y10T 29/49336
USPC ........................................ 29/889.7, 557, 558
See application file for complete search history.

(56) References Cited

U.S. PATENT DOCUMENTS

| | | | |
|---|---|---|---|
| 7,300,255 B2* | 11/2007 | Potter | F01D 5/282 |
| | | | 416/229 A |
| 8,980,031 B2* | 3/2015 | Dambrine | B29C 70/467 |
| | | | 156/148 |
| 9,555,592 B2 | 1/2017 | Illand | |
| 10,180,071 B2 | 1/2019 | Freeman et al. | |
| 10,253,639 B2* | 4/2019 | Sippel | F01D 5/282 |
| 10,337,336 B2 | 7/2019 | Mantel | |
| 2009/0090005 A1* | 4/2009 | Carper | C04B 35/58092 |
| | | | 29/888.02 |
| 2015/0275671 A1* | 10/2015 | Conete | C04B 41/50 |
| | | | 427/140 |
| 2016/0137559 A1* | 5/2016 | Chamberlain | C22C 27/025 |
| | | | 428/454 |
| 2016/0245100 A1* | 8/2016 | Luczak | F01D 5/288 |
| 2017/0298778 A1* | 10/2017 | Twell | F01D 5/3007 |

* cited by examiner

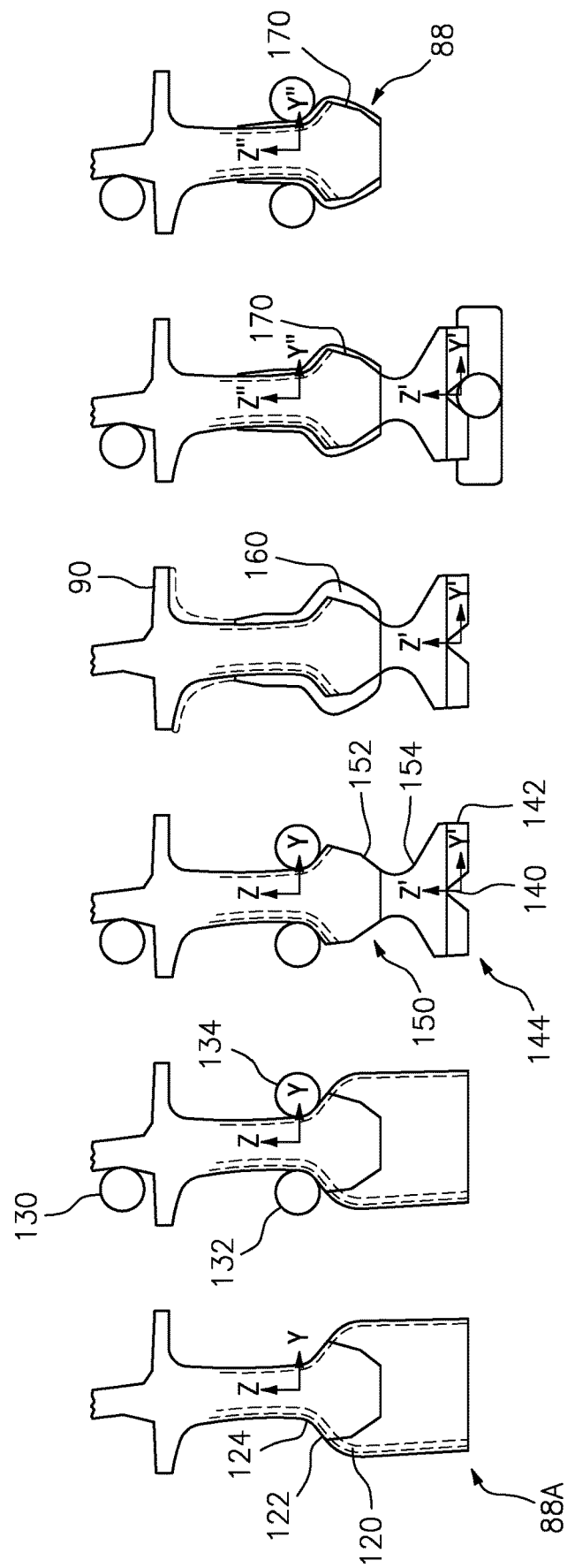

CERAMIC MATRIX COMPOSITE ROTOR BLADE ATTACHMENT AND METHOD OF MANUFACTURE THEREFOR

BACKGROUND

The present disclosure relates to ceramic matrix composite (CMC) turbine blade assemblies, and more particularly, to a method of manufacture thereof that utilizes a sacrificial datum.

Gas turbine engines, such as those which power modern commercial and military aircraft, include a compressor section, combustor section and turbine section arranged longitudinally around the engine centerline so as to provide an annular gas flow path. The compressor section compresses incoming atmospheric gases that are then mixed with a combustible fuel product and burned in the combustor section to produce a high energy exhaust gas stream. The turbine section extracts power from the exhaust gas stream to drive the compressor section. The exhaust gas stream produces forward thrust as it rearwardly exits the turbine section. Some engines may include a fan section, which is also driven by the turbine section, to produce bypass thrust.

Gas path components, such as turbine blades manufactured of nickel-based super alloys that operate in the high temperatures encountered by aerospace and gas turbine engines, typically includes airfoil cooling that may be accomplished by external film cooling, internal air impingement, and forced convection, either separately, or in combination.

More recently, ceramic matrix composite (CMC) rotor blades have the potential to operate in the high temperatures without airfoil cooling. CMCs consist of ceramic fibers coated with thin ceramic coatings arranged into a ceramic matrix—a combination of inherently brittle materials which together provide metal-like toughness.

The process of manufacturing a CMC blade is relatively complicated as attachment profile tolerances are typically an order of magnitude smaller than the CMC tow size and CMC processing variation. Cutting composite plys to achieve the desired profile tolerances may also reduce the strength and reliability.

SUMMARY

A component with an airfoil for a gas turbine engine according to one disclosed non-limiting embodiment of the present disclosure includes a composite root with a multiple of outer composite plys and a machined coating layer at least partially around the root, the final machined layer machined from an oversized coating layer, wherein none of the outer composite plys under the machined coating layer are cut during machining of the oversized coating layer.

A further embodiment of any of the foregoing embodiments of the present disclosure includes that the machined coating layer is applied as the oversized coating layer prior to being machined.

A further embodiment of any of the foregoing embodiments of the present disclosure includes that the oversized coating layer prior to being machined is of a thickness between 0.030-0.040 inch (0.762-1.016 mm).

A further embodiment of any of the foregoing embodiments of the present disclosure includes that the machined coating layer is of a thickness of 0.010 inches (0.254 mm).

A further embodiment of any of the foregoing embodiments of the present disclosure includes that the machined coating layer essentially fills the plys of the root to provide a smooth final interface surface.

A further embodiment of any of the foregoing embodiments of the present disclosure includes that the machined coating layer extends to an underplatform region of ceramic matrix composite blade that extends composite root.

A further embodiment of any of the foregoing embodiments of the present disclosure includes that the composite root extends from an airfoil.

A further embodiment of any of the foregoing embodiments of the present disclosure includes that the component is a rotor blade.

A further embodiment of any of the foregoing embodiments of the present disclosure includes that the outer composite plys follow an outer mold line contour outer composite plys.

A further embodiment of any of the foregoing embodiments of the present disclosure includes that a relative position of the outer composite plys are positioned within tolerances that are less than +/−0.005 inch (+/−0.127 mm).

A further embodiment of any of the foregoing embodiments of the present disclosure includes that the outer composite plys form a smooth ply transition at an attachment fillet radii.

A further embodiment of any of the foregoing embodiments of the present disclosure includes that the attachment fillet radii define an interface with a respective blade slot in a rim of the disk.

A process for manufacturing a composite component according to one disclosed non-limiting embodiment of the present disclosure includes manufacturing an oversized root region of a root region of a composite rotor blade; fixturing the composite component into a machining fixture at a primary Y and Z axis datum located at an attachment fillet radii of the root region; machining V-notches into the oversized root region to form a Y' and Z' axis datum of a sacrificial datum in relation to the primary Y and Z axis datum; applying an oversized coating layer over the attachment fillet radii of the root region; fixturing the composite component into a machining fixture at the Y' and Z' axis datum of the sacrificial datum; machining the oversized coating layer to a machined coating layer forming a Y" and Z" axis datum with respect to the Y' and Z' axis datum of the sacrificial datum; fixturing the composite component into a machining fixture at the Y" and Z" axis datum; and machining off the sacrificial datum removing the V-notches.

A further embodiment of any of the foregoing embodiments of the present disclosure includes that machining the oversized coating layer to the machined coating layer avoids cutting any of a multiple of outer composite plys that form the attachment fillet radii of the root region.

A further embodiment of any of the foregoing embodiments of the present disclosure includes that a relative position of the outer composite plys are positioned within tolerances that are less than +/−0.005 inch (+/−0.127 mm).

A further embodiment of any of the foregoing embodiments of the present disclosure includes that the outer composite plys are outer plys which follow an outer mold line contour to create a smooth ply transition at the attachment fillet radii.

A further embodiment of any of the foregoing embodiments of the present disclosure includes that the attachment fillet radii define an interface with a respective blade slot in a rim of the disk.

A further embodiment of any of the foregoing embodiments of the present disclosure includes machining an undercut and a clearance cut into the oversized root region to at least partially form a root profile of the root region prior to applying the oversized coating layer.

A further embodiment of any of the foregoing embodiments of the present disclosure includes silicon plasma spraying the oversized coating layer.

A further embodiment of any of the foregoing embodiments of the present disclosure includes additively manufacturing the oversized coating layer.

The foregoing features and elements may be combined in various combinations without exclusivity, unless expressly indicated otherwise. These features and elements as well as the operation thereof will become more apparent in light of the following description and the accompanying drawings. It should be appreciated; however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 4 is a schematic view of a step in the process of FIG. 3 illustrating an enlarged root section.

FIG. 5 is a schematic view of a step in the process of FIG. 3 illustrating installation in a fixture.

FIG. 6 is a schematic view of a step in the process of FIG. 3 illustrating machining of the enlarged root section to form the sacrificial datum.

FIG. 7 is a schematic view of a step in the process of FIG. 3 illustrating application of an oversized coating layer to the root section.

FIG. 9 is a schematic view of a step in the process of FIG. 3 illustrating fixturing via the sacrificial datum.

FIG. 10 is a schematic view of a step in the process of FIG. 3 illustrating fixturing via the Y" and Z" datum and removal of the sacrificial datum.

DETAILED DESCRIPTION

Figure 1:
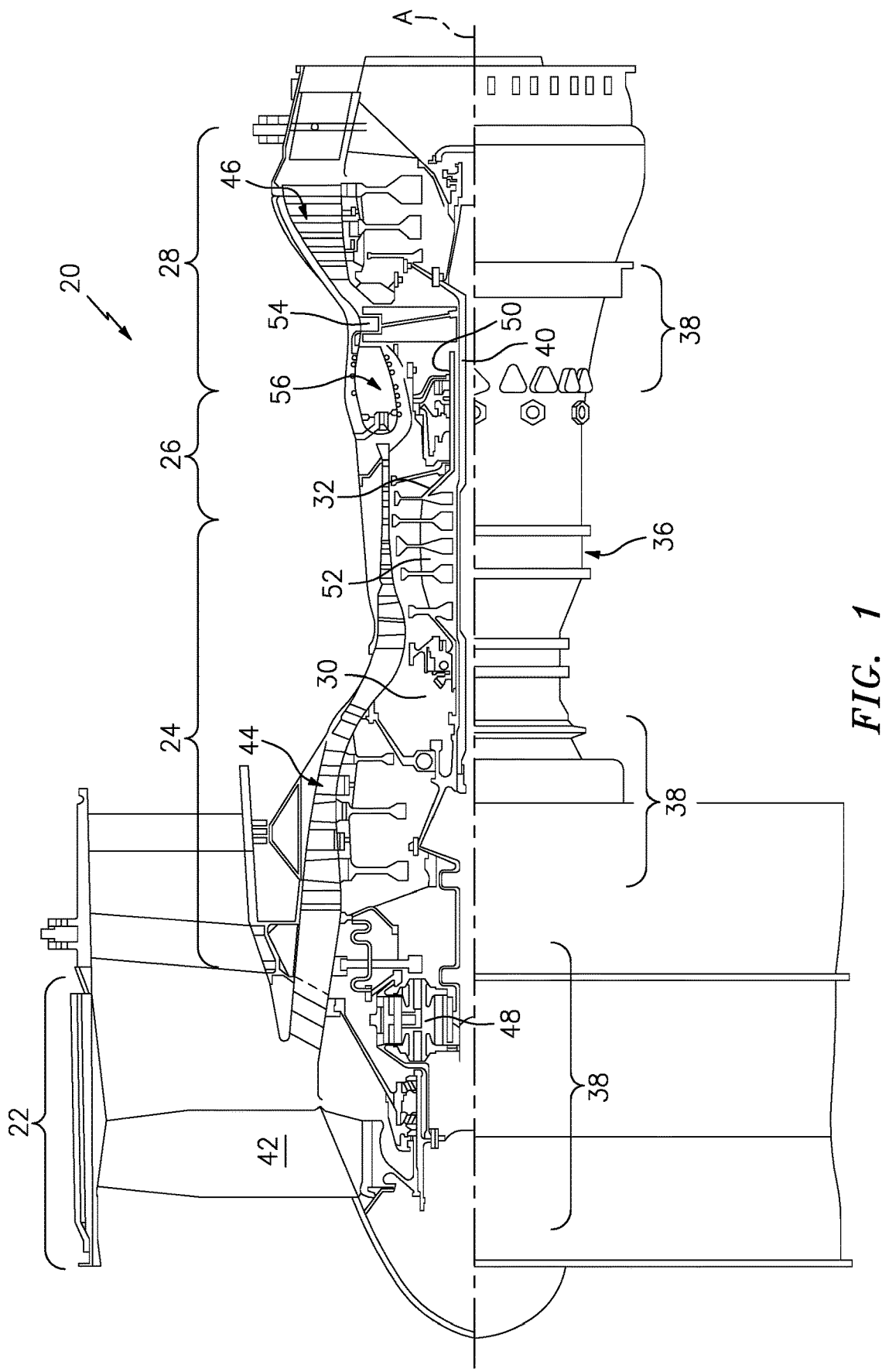
FIG. 1 is a schematic cross-section of an example gas turbine engine architecture.

FIG. 1 schematically illustrates a gas turbine engine 20. The gas turbine engine 20 as disclosed herein is a two spool turbofan that generally incorporates a fan section 22, a compressor section 24, a combustor section 26, and a turbine section 28. The fan section 22 drives air along a bypass flowpath while the compressor section 24 drives air along a high temperature core flowpath for compression and communication into the combustor section 26, then expansion through the turbine section 28. Although depicted as a high bypass gas turbofan engine architecture in the disclosed non-limiting embodiment, it should be appreciated that the concepts described herein are not limited only thereto.

The engine 20 generally includes a low spool 30 and a high spool 32 mounted for rotation around an engine central longitudinal axis A relative to an engine case structure 36 via several bearings 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system. The high spool 32 includes an outer shaft 50 that interconnects a high pressure compressor ("HPC") 52 and high pressure turbine ("HPT") 54. A combustor 56 is arranged between the HPC 52 and the HPT 54.

Figure 2:
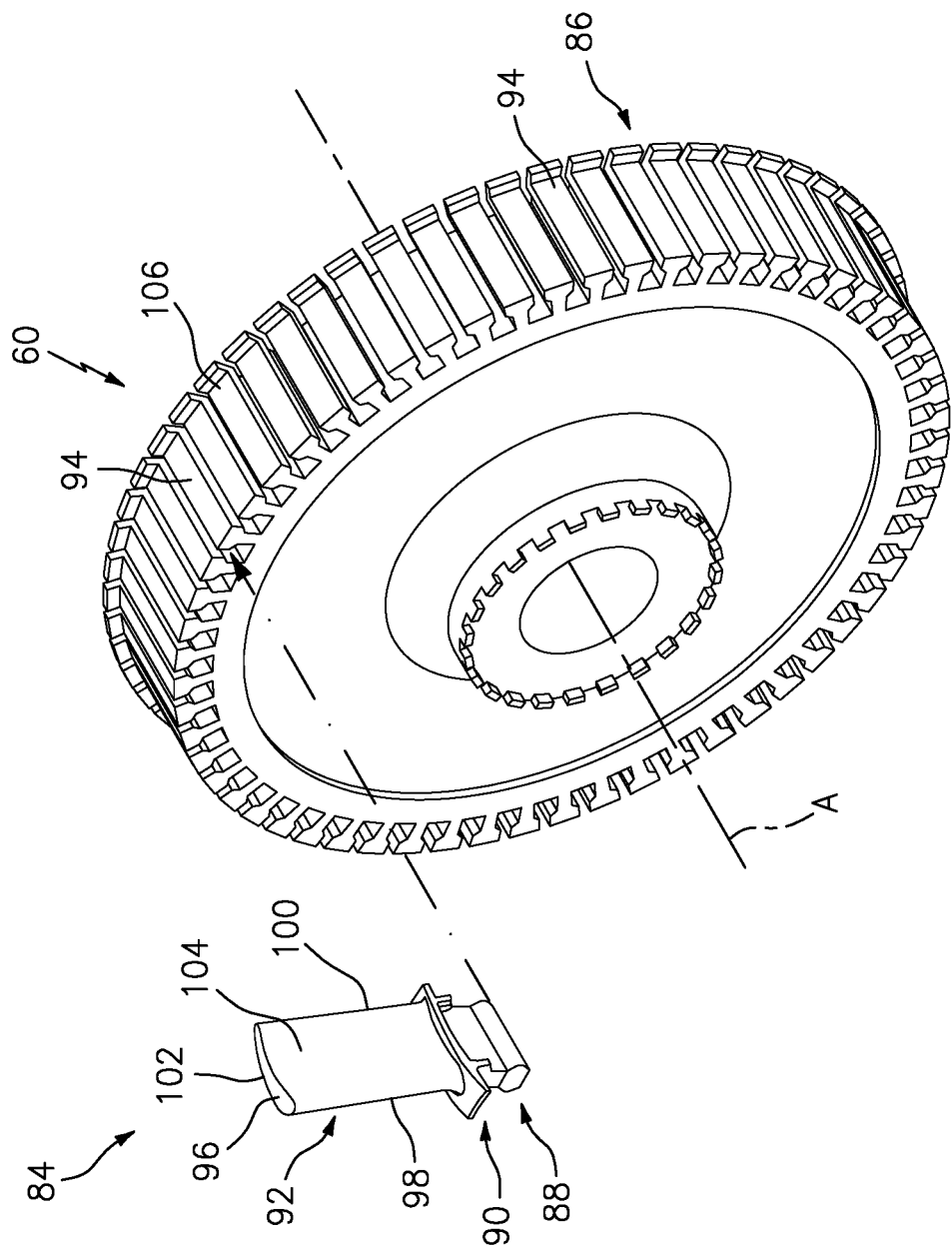
FIG. 2 is an exploded view of a rotor assembly with a single representative ceramic matrix composite turbine blade.

With reference to FIG. 2, a rotor assembly 60 such as a turbine rotor assembly includes an array of blades 84 (one shown) circumferentially disposed around a disk 86. The disk 86 may be subtractive or additive manufactured of nickel-based super alloys that operate in high temperature environments, such as, for example, environments typically encountered by aerospace and gas turbine engine hot section components. In some embodiments, the nickel-based alloy may be Inconel 718, Waspaloy, IN-100, ME-16.

Each CMC blade 84 includes a root region 88, a platform 90 and an airfoil 92. The platform 90 separates a gas path side inclusive of the airfoil 92 and a non-gas path side inclusive of the root region 88. Although the platform 90 is illustrated as integral in the illustrated embodiment, other geometries in which the platform 90 is a separate component may alternatively be utilized. The airfoil 92 defines a blade chord between a leading edge 98, which may include various forward and/or aft sweep configurations, and a trailing edge 100. A first sidewall 102 that may be convex to define a suction side, and a second sidewall 104 that may be concave to define a pressure side are joined at the leading edge 98 and at the axially spaced trailing edge 100. The tip 96 extends between the sidewalls 102, 104 opposite the platform 90.

Each blade root region 88 is received within a respective blade slot 94 in a rim 106 of the disk 86 such that the airfoil 92 extends therefrom. In one example, the blade root region 88 is generally teardrop shaped. However, other shapes such as fir-trees, flared, and other shapes are contemplated. In the illustrated embodiment, a CMC blade 84 is disclosed in detail, however other composite components which require an attachment such as the root region 88 to include but not be limited to vanes, Blade Outer Air Seals, struts, etc., will also benefit herefrom.

The ceramic matrix composite (CMC) or organic matrix composite (OMC) material material typically includes prepreg ceramic plys that include prepreg ceramic fiber tows, the tows in each ply lying adjacent to one another in a planar arrangement such that each ply has a unidirectional orientation. Examples of CMC materials include, but are not limited to, carbon-fiber-reinforced carbon (C/C), carbon-fiber-reinforced silicon carbide (C/SiC), silicon-carbide-fiber-reinforced silicon carbide (SiC/SiC), alumina-fiber-reinforced alumina ($Al_2O_3/Al_2O_3$), organic matrix composite (e.g. carbon fiber epoxy) or combinations thereof. The CMC may have increased elongation, fracture toughness, thermal shock, dynamic load capability, and anisotropic properties as compared to a monolithic ceramic structure. Other Ceramic matrix composite (CMC) materials may utilize tackified ceramic fabric/fibers whereby the fibers have not been infiltrated with matrix material, 3D weave architectures of dry fabrics, and others. Although CMCs are primarily discussed in the disclosed embodiment, other such non-metallic materials may also be utilized to form the component.

Manufacture of the CMC blade 84 typically includes laying up pre-impregnated composite fibers having a matrix material already present (prepreg) to form the geometry of the part (pre-form), autoclaving and burning out the pre-form, infiltrating the burned-out pre-form with the melting matrix material, then final machining and treatments of the pre-form. Infiltrating the pre-form may include depositing the ceramic matrix out of a gas mixture, pyrolyzing a pre-ceramic polymer, chemically reacting elements, sintering, generally in the temperature range of 1700-3000 F (925-1650 C), or electrophoretically depositing a ceramic powder. With respect to airfoils, the CMC may be located over a metal spar to form only the outer surface of the airfoil.

In the illustrated embodiment, the root region 88 may include a flared surface adjacent to a neck. However, other shapes such as teardrop, fir-trees, and other shapes are contemplated. The relatively simple root region 88 facilitates a relatively short neck. The root region 88 may be silicon plasma sprayed to facilitate final machining of the shape into the CMC materials. The blade 84 may include relatively simple geometries that are loaded primarily in one direction (radial pull) that have been created in ceramic matrix composite (CMC) or organic matrix composite (OMC) material with relatively direct ply orientations having minimal bending.

The ceramic matrix composite (CMC) or organic matrix composite (OMC) material typically includes laying up pre-impregnated composite fibers having a matrix material already present (prepreg) to form the geometry of the part (pre-form), autoclaving and burning out the pre-form, infiltrating the burned-out pre-form with the melting matrix material, and any machining or further treatments of the pre-form. Infiltrating the pre-form may include depositing the ceramic matrix out of a gas mixture, pyrolyzing a pre-ceramic polymer, chemically reacting elements, sintering, generally in the temperature range of 1700-3000 F (925-1650 C), or electrophoretically depositing a ceramic powder. With respect to turbine airfoils, the CMC may be located over a metal spar to form only the outer surface of the airfoil. Examples of CMC materials include, but are not limited to, carbon-fiber-reinforced carbon (C/C), carbon-fiber-reinforced silicon carbide (C/SiC), silicon-carbide-fiber-reinforced silicon carbide (SiC/SiC), alumina-fiber-reinforced alumina, or combinations thereof. The CMC may have increased elongation, fracture toughness, thermal shock, dynamic load capability, and anisotropic properties as compared to a monolithic ceramic structure.

Figure 3:
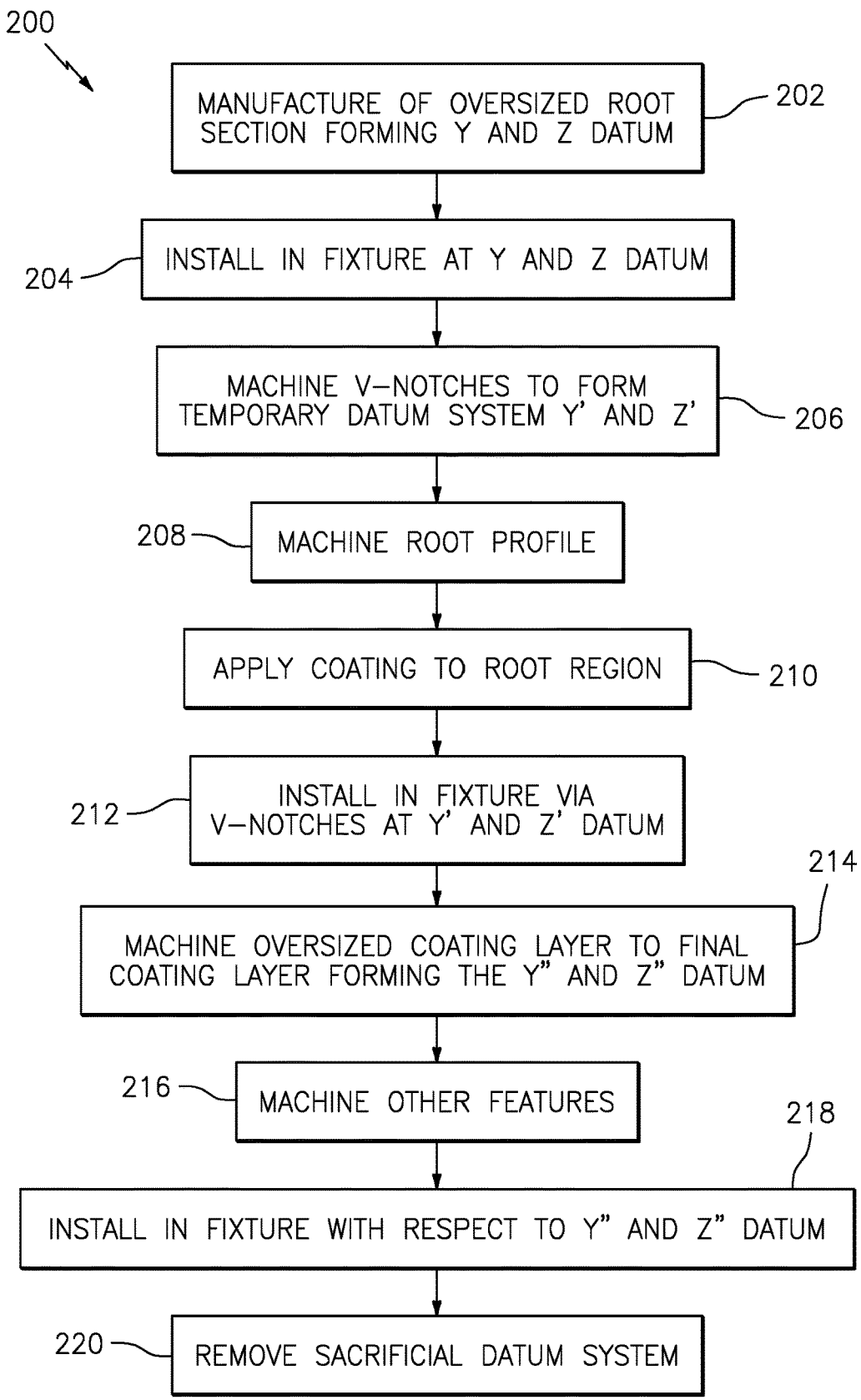
FIG. 3 is a block diagram representing the process steps to manufacture the ceramic matrix composite turbine blade that utilizes a sacrificial datum.

With reference to FIG. 3, a process 200 to manufacture the CMC blade 84 is initiated via manufacture (202) such as molding of an oversized root region 88A (FIG. 4). The oversized root region 88A is larger than the final root region 88.

The final root region 88 includes outer composite plys 120 that are the outermost plys which follow an outer mold line contour 122 to form a smooth ply transition at a attachment fillet radii 124. The outer composite plys 120 are those plys which are not to be cut during later processing of the root region 88. The attachment fillet radii 124 is where the CMC blade 84 will interface with the respective blade slot 94 in the rim 106 of the disk 86 (FIG. 2).

Next, the CMC blade 84 is installed (204) into a machining fixture (illustrated schematically by pins 130, 132, 134; FIG. 5). The machining fixture may be utilized to grind or otherwise machine the blade 84 with respect to a datum to maintain accurate tolerances. A primary datum is defined on both sides of the root region 88 of the attachment fillet radii 124 which control the Y and Z axis datums (pins 132, 134). The X axis datum may be controlled by pin 130 which interfaces with the airfoil contour.

Next, V-notches 140, 142 are machined (206; FIG. 6) into the oversized root region 88A to form a Y' and Z' axis datums of a sacrificial datum 144. The V-notches 140, 142 are perpendicular to each other and on a bottom surface of the oversized root region 88A.

Next, a root profile 150 is machined (208) into the oversized root region 88A to form CMC root region 88B undercuts 152 via clearance cuts 154. The root profile 150 is that which is formed prior to the coating application (210). The undercuts 152 are the inward surfaces and the clearance cuts 154 are the outward surfaces of the dovetail in the oversized root region 88A.

Figure 8:
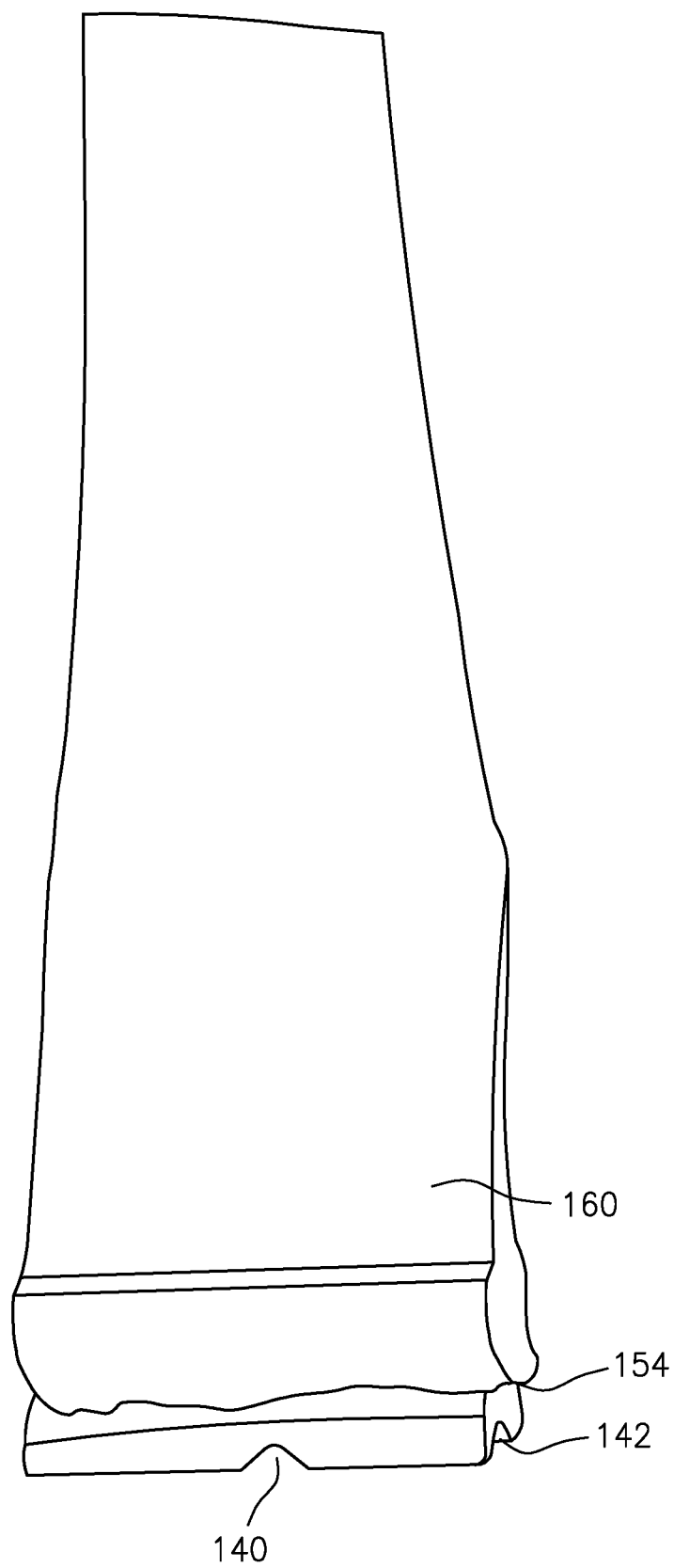
FIG. 8 is a side view the oversized coating layer on the root section.

Next, the V-notches 140, 142 that form the Y' and Z' datum may be masked or otherwise protected such that an oversized coating layer 160 (FIGS. 7 and 8) may be applied (step 210; FIG. 3). The oversized coating layer 160 may be applied to the root profile 150 via, for example, plasma spray or additively manufacturing. The underplatform may additionally be coated either separately at this time or in conjunction with the oversized coating layer 160. That is, the oversized coating layer 160 may extend up to and along an underplatform region of the platform 90 to support accurate location of blade seals and dampers with respect to the platform 90.

The oversized coating layer 160 facilitates final machining to the final root region shape of the CMC root region 88B. The oversized coating layer 160 may be any combination of materials such as silicon plasma metallic materials, added CMC layers which can be machined and are not critical, composite materials, non-metallic materials, etc. The oversized coating layer 160 may be coatings containing a volume percent of silicon carbide deposited by plasma spray for protection of CMC against wear and high temperature oxidation. The oversized coating layer 160 may be of a thickness between 0.030-0.040 inch (0.762-1.016 mm).

Next, the blade 84 is fixtured (step 212 in FIG. 3; fixtures shown in FIG. 9) at the V-notches 140, 142 that form the Y' and Z' datum. The oversized coating layer 160 is then machined (214) to a machined coating layer 170 which form the Y" and Z" datums. The machined coating layer 170 may be of a thickness of about 0.010 inches (0.254 mm). That is, the machined coating layer 170 essentially becomes a filler of the plys and provides a smooth final interface surface for the blade 84 to the respective blade slot 94 in the rim 106 of the disk 86.

The Y" and Z" datums are formed by the machined coating layer 170 and are located with respect to where the CMC blade 84 is to be retained within the respective blade slot 94 in the rim 106 of the disk 86. The controlled transfer of datums between the as-molded composite plys and the final coated attachment of the machined coating layer 170, assures the relative position of the outer composite plys 120 and the radii of the final external attachment root profile is positioned within tight tolerances that may be less than +/−0.005 inch (+/−0.127 mm) to provide the highest structural capability and lowest part-to-part variation in attachment strength. Also, none of the outer composite plys 120 are cut as only the oversized coating layer 160 is machined. Other features may then be machined (216) such as the leading edge 98 and the trailing edge 100 as well as the fore and aft faces 172, 174 of the root region 88.

Next, the blade 84 is fixtured (step 218 in FIG. 3; fixtures shown in FIG. 10) with respect to the Y" and Z" datums where the CMC blade 84 is to be retained within the respective blade slot 94 in the rim 106 of the disk 86. The fixture pins 130, 132 may be separated by about 0.010-0.020 inches (0.254-0.508 mm) as compared to step (204) to represent the ideal blade slot 94 in the rim 106 of the disk 86. That is, the fixturing (218) represents the installed position of the blade 84.

Figure 11:
FIG. 11 is a side view of the final root section.

Next, the oversized root region 88A that forms the Y' and Z' datum of the sacrificial datum 144 is removed (step 220; side view of the final root section shown in FIG. 11). The root region 88 may then be seal coated or otherwise finalized as required.

The oversized root region 88A permits formation of a sacrificial datum to facilitate the accurate transfer of datum's during manufacture. Structural analysis has shown that the relative position of the attachment fillet radii to the bearing surface of the CMC blade was the largest variable when calculating attachment strength and this process assures accurate manufacture of the bearing surfaces as well as avoidance of damage to critical plys.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason, the appended claims should be studied to determine true scope and content.

What is claimed:

1. A component with an airfoil for a gas turbine engine, comprising:
    an airfoil;
    a composite root with a multiple of outer composite plys, the composite root extends from the airfoil; and
    a machined coating layer at least partially around the composite root, the final machined layer machined from an oversized coating layer, wherein none of the outer composite plys under the machined coating layer applied as the oversized coating layer prior to being machined to form the machined coating layer are cut during machining of the oversized coating layer, the oversized coating layer having had machined V-notches that form a Y' and Z' axis datum of a sacrificial datum in relation to a primary Y and Z axis datum prior to being machined to form the machined coating layer.

2. The component as recited in claim 1, wherein the oversized coating layer prior to being machined is of a thickness between 0.030-0.040 inch (0.762-1.016 mm).

3. The component as recited in claim 2, wherein the machined coating layer is of a thickness of 0.010 inches (0.254 mm).

4. The component as recited in claim 2, wherein the machined coating layer fills the plys of the root to provide a smooth final interface surface.

5. The component as recited in claim 2, wherein the machined coating layer extends to an underplatform region of ceramic matrix composite blade that extends to the composite root.

6. The component as recited in claim 1, wherein the component is a rotor blade.

7. The component as recited in claim 1, wherein the outer composite plys follow an outer mold line.

8. The component as recited in claim 7, wherein a relative position of the outer composite plys are positioned within tolerances that are less than +/−0.005 inch (+/−0.127 mm).

9. The component as recited in claim 7, wherein the outer composite plys form a smooth ply transition at an attachment fillet radii.

10. The component as recited in claim 7, wherein the attachment fillet radii define an interface with a respective blade slot in a rim of the disk.

11. A process for manufacturing a composite component, comprising:
    manufacturing an oversized root region of a composite component;
    fixturing the composite component into a machining fixture at a primary Y and Z axis datum located at an attachment fillet radii of the oversized root region;
    machining V-notches into the oversized root region to form a Y' and Z' axis datum of a sacrificial datum in relation to the primary Y and Z axis datum;
    applying an oversized coating layer over the attachment fillet radii of the root region;
    fixturing the composite component into a machining fixture at the Y' and Z' axis datum of the sacrificial datum;
    machining the oversized coating layer to a machined coating layer forming a Y" and Z" axis datum with respect to the Y' and Z' axis datum of the sacrificial datum;
    fixturing the composite component into a machining fixture at the Y" and Z" axis datum; and
    machining off the sacrificial datum removing the V-notches.

12. The process as recited in claim 11, wherein machining the oversized coating layer to the machined coating layer avoids cutting any of a multiple of outer composite plys that form the attachment fillet radii of the root region.

13. The process as recited in claim 12, wherein a relative position of the outer composite plys are positioned within tolerances that are less than +/−0.005 inch (+/−0.127 mm).

14. The process as recited in claim 13, wherein the outer composite plys are outer plys which follow an outer mold line contour to create a smooth ply transition at the attachment fillet radii.

15. The process as recited in claim 14, wherein the attachment fillet radii define an interface with a respective blade slot in a rim of the disk.

16. The process as recited in claim 11, further comprising machining an undercut and a clearance cut into the oversized root region to at least partially form a root profile of the root region prior to applying the oversized coating layer.

17. The process as recited in claim 11, further comprising silicon plasma spraying the oversized coating layer.

18. The process as recited in claim 11, further comprising additively manufacturing the oversized coating layer.

* * * * *